(12) United States Patent
Noviello et al.

(10) Patent No.: US 8,219,480 B2
(45) Date of Patent: Jul. 10, 2012

(54) SYSTEMS AND METHODS FOR PROTECTING AGAINST ERRONEOUS PRICE ENTRIES IN THE ELECTRONIC TRADING OF FINANCIAL AND OTHER INSTRUMENTS

(75) Inventors: Joseph Noviello, New York, NY (US); Lon Steger, Jersey City, NJ (US); Matt Claus, Summit, NJ (US); Howard W Lutnick, New York, NY (US); Michael Sweeting, Aldershot (GB); Kevin M Foley, New York, NY (US)

(73) Assignee: BGC Partners, Inc., New York, NY (US)

( * ) Notice: Subject to any disclaimer, the term of this patent is extended or adjusted under 35 U.S.C. 154(b) by 1307 days.

(21) Appl. No.: 11/215,236

(22) Filed: Aug. 30, 2005

(65) Prior Publication Data

US 2006/0218072 A1  Sep. 28, 2006

Related U.S. Application Data

(60) Provisional application No. 60/665,306, filed on Mar. 24, 2005.

(51) Int. Cl.
*G06Q 40/00* (2012.01)
(52) U.S. Cl. ............................ 705/37; 705/36; 705/36 R
(58) Field of Classification Search .................... 705/36, 705/36 R, 37
See application file for complete search history.

(56) References Cited

U.S. PATENT DOCUMENTS

| | | | |
|---|---|---|---|
| 2,134,118 A | 10/1938 | Foss | |
| 3,541,526 A | 11/1970 | Levy, et al. | |
| 3,573,747 A | 4/1971 | Adams et al. | |
| 3,581,072 A | 5/1971 | Nymeyer | |
| 3,656,148 A | 4/1972 | Belcher et al. | |
| 3,976,840 A | 8/1976 | Cleveland et al. | |
| 4,141,001 A | 2/1979 | Suzuki et al. | |
| 4,412,287 A | 10/1983 | Braddock, III | |
| 4,551,717 A | 11/1985 | Dreher | |
| 4,674,044 A | 6/1987 | Kalmus et al. | |
| 4,677,552 A | 6/1987 | Sibley, Jr. | |
| 4,789,928 A | 12/1988 | Fujisaki | |
| 4,799,156 A | 1/1989 | Shavit et al. | |
| 4,823,265 A | 4/1989 | Nelson | |

(Continued)

FOREIGN PATENT DOCUMENTS

AU  691467  5/1998

(Continued)

OTHER PUBLICATIONS

Anderson et al.: Hedging with a put option, Texas Agricultural Extension Services, The Texas A&M University System, Jun. 1998, pp. 1-4.*

(Continued)

*Primary Examiner* — Bijendra K Shrestha

(57) ABSTRACT

The invention relates to systems and methods that provide a user interface for use with an electronic trading system. The interface notifies the user that the price at which he or she may have attempted to trade has changed and presents the user with the opportunity to submit, modify or cancel the trade command. The user may configure the trading system to enable such a notification based on the time span for the price change, the number of increments of the price change, a combination thereof or any other appropriate consideration for protecting against the occurrence of erroneous price entries. Subsequent trade commands, such as those entered by third parties, may be used to validate prices and execute trades at these prices.

25 Claims, 3 Drawing Sheets

U.S. PATENT DOCUMENTS

| | | |
|---|---|---|
| 4,903,201 A | 2/1990 | Wagner |
| 4,906,117 A | 3/1990 | Birdwell |
| 4,951,196 A | 8/1990 | Jackson |
| 4,980,826 A | 12/1990 | Wagner |
| 5,038,284 A | 8/1991 | Kramer |
| 5,077,665 A | 12/1991 | Silverman et al. |
| 5,101,353 A | 3/1992 | Lupien et al. |
| 5,136,501 A | 8/1992 | Silverman et al. |
| 5,150,118 A | 9/1992 | Finkle et al. |
| 5,168,446 A | 12/1992 | Wiseman |
| 5,181,809 A | 1/1993 | Martin |
| 5,193,924 A | 3/1993 | Larson |
| 5,195,031 A | 3/1993 | Ordish |
| 5,243,331 A | 9/1993 | McCausland et al. |
| 5,253,940 A | 10/1993 | Abecassis |
| 5,258,908 A | 11/1993 | Hartheimer et al. |
| 5,297,031 A | 3/1994 | Gutterman et al. |
| 5,297,032 A | 3/1994 | Trojan et al. |
| 5,305,200 A | 4/1994 | Hartheimer et al. |
| 5,339,392 A | 8/1994 | Risberg et al. |
| 5,347,452 A | 9/1994 | Bay, Jr. |
| 5,361,199 A | 11/1994 | Shoquist et al. |
| 5,367,298 A | 11/1994 | Axthelm |
| 5,373,055 A | 12/1994 | Ohmae et al. |
| 5,375,055 A | 12/1994 | Togher et al. |
| 5,463,547 A | 10/1995 | Markowitz et al. |
| 5,579,002 A | 11/1996 | Iggulden et al. |
| 5,615,109 A | 3/1997 | Eder |
| 5,640,569 A | 6/1997 | Miller et al. |
| 5,667,319 A | 9/1997 | Satloff |
| 5,668,358 A | 9/1997 | Wolf et al. |
| 5,689,652 A | 11/1997 | Lupien et al. |
| 5,710,889 A | 1/1998 | Clark et al. |
| 5,715,402 A | 2/1998 | Popolo |
| 5,717,989 A | 2/1998 | Tozzoli et al. |
| 5,727,165 A | 3/1998 | Ordish et al. |
| 5,757,292 A | 5/1998 | Amro et al. |
| 5,774,880 A | 6/1998 | Ginsberg |
| 5,787,402 A | 7/1998 | Potter et al. |
| 5,794,207 A | 8/1998 | Walker et al. |
| 5,794,219 A | 8/1998 | Brown |
| 5,802,497 A | 9/1998 | Manasse |
| 5,826,244 A | 10/1998 | Huberman |
| 5,832,462 A | 11/1998 | Midorikawa et al. |
| 5,835,896 A | 11/1998 | Fisher et al. |
| 5,842,178 A | 11/1998 | Giovannoli |
| 5,845,261 A | 12/1998 | McAbian |
| 5,845,266 A | 12/1998 | Lupien |
| 5,873,071 A | 2/1999 | Ferstenberg et al. |
| 5,878,139 A | 3/1999 | Rosen |
| 5,890,138 A | 3/1999 | Godin |
| 5,905,974 A | 5/1999 | Fraser et al. |
| 5,905,975 A | 5/1999 | Ausubel |
| 5,914,715 A | 6/1999 | Sasaki |
| 5,915,209 A | 6/1999 | Lawrence |
| 5,924,082 A | 7/1999 | Silverman et al. |
| 5,926,801 A | 7/1999 | Matsubara et al. |
| 5,950,176 A | 9/1999 | Keiser et al. |
| 5,963,923 A | 10/1999 | Garber |
| 5,987,419 A | 11/1999 | Hachino et al. |
| 6,014,627 A | 1/2000 | Togher et al. |
| 6,016,483 A | 1/2000 | Richard et al. |
| 6,029,146 A | 2/2000 | Hawkins et al. |
| 6,085,168 A | 7/2000 | Mori et al. |
| 6,098,051 A | 8/2000 | Lupien et al. |
| 6,119,101 A | 9/2000 | Peckover |
| 6,131,085 A | 10/2000 | Rossides |
| 6,134,535 A | 10/2000 | Belzberg |
| 6,141,653 A | 10/2000 | Conklin et al. |
| 6,151,588 A | 11/2000 | Tozzoli et al. |
| 6,195,647 B1 | 2/2001 | Martyn et al. |
| 6,199,050 B1 | 3/2001 | Alaia et al. |
| 6,211,880 B1 | 4/2001 | Impink, Jr. |
| 6,230,146 B1 | 5/2001 | Alaia et al. |
| 6,230,147 B1 | 5/2001 | Alaia et al. |
| 6,247,000 B1 | 6/2001 | Hawkins et al. |
| 6,259,044 B1 | 7/2001 | Paratore et al. |
| 6,263,321 B1 | 7/2001 | Daughtery, III |
| 6,272,474 B1 | 8/2001 | Garcia |
| 6,278,982 B1 | 8/2001 | Korhammer et al. |
| 6,282,521 B1 | 8/2001 | Howorka |
| 6,311,178 B1 | 10/2001 | Bi et al. |
| 6,317,727 B1 | 11/2001 | May |
| 6,317,728 B1 | 11/2001 | Kane |
| 6,343,278 B1 | 1/2002 | Jain et al. |
| 6,363,365 B1 | 3/2002 | Kou |
| 6,405,180 B2 | 6/2002 | Tilfors et al. |
| 6,421,653 B1 | 7/2002 | May |
| 6,434,536 B1 * | 8/2002 | Geiger ............................ 705/37 |
| 6,438,575 B1 | 8/2002 | Khan et al. |
| 6,477,513 B1 | 11/2002 | Walker et al. |
| 6,505,174 B1 | 1/2003 | Keiser et al. |
| 6,510,418 B1 | 1/2003 | Case et al. |
| 6,519,574 B1 | 2/2003 | Wilton et al. |
| 6,560,580 B1 | 5/2003 | Fraser et al. |
| 6,625,583 B1 | 9/2003 | Silverman et al. |
| 6,629,082 B1 | 9/2003 | Hambrecht |
| 6,772,132 B1 | 8/2004 | Kemp, II et al. |
| 6,823,318 B1 | 11/2004 | Creswell et al. |
| 6,850,907 B2 | 2/2005 | Lutnick et al. |
| 6,903,662 B2 | 6/2005 | Rix et al. |
| 6,912,126 B2 | 6/2005 | Rudd et al. |
| 6,963,856 B2 | 11/2005 | Lutnick et al. |
| 6,965,511 B2 | 11/2005 | Rudd et al. |
| 7,000,181 B2 | 2/2006 | Press |
| 7,003,488 B2 | 2/2006 | Dunne et al. |
| 3,249,919 A1 | 5/2006 | Scantlin |
| 7,076,461 B2 * | 7/2006 | Balabon ....................... 705/37 |
| 7,080,033 B2 | 7/2006 | Wilton et al. |
| 7,157,651 B2 | 1/2007 | Rix et al. |
| 7,243,083 B2 | 7/2007 | Burns et al. |
| 7,283,067 B2 | 10/2007 | Lutnick et al. |
| 7,392,212 B2 | 6/2008 | Hancock et al. |
| 7,392,214 B1 | 6/2008 | Fraser et al. |
| 7,392,217 B2 | 6/2008 | Gilbert et al. |
| 7,400,270 B2 | 7/2008 | Lutnick et al. |
| 7,496,533 B1 | 2/2009 | Keith |
| 7,523,064 B2 * | 4/2009 | Burns et al. ..................... 705/37 |
| 7,552,084 B2 | 6/2009 | Fraser et al. |
| 2001/0003179 A1 | 6/2001 | Martyn et al. |
| 2001/0032175 A1 | 10/2001 | Holden et al. |
| 2001/0037279 A1 | 11/2001 | Yeo |
| 2002/0023037 A1 | 2/2002 | White |
| 2002/0023042 A1 | 2/2002 | Solomon |
| 2002/0026321 A1 | 2/2002 | Faris et al. |
| 2002/0029180 A1 | 3/2002 | Kirwin et al. |
| 2002/0070915 A1 | 6/2002 | Mazza et al. |
| 2002/0073014 A1 | 6/2002 | Gilbert |
| 2002/0082976 A1 | 6/2002 | Howorka |
| 2002/0091626 A1 | 7/2002 | Johnson et al. |
| 2002/0107784 A1 | 8/2002 | Hancock et al. |
| 2002/0128945 A1 | 9/2002 | Moss et al. |
| 2002/0143690 A1 * | 10/2002 | Mahajan et al. ................. 705/37 |
| 2002/0154038 A1 | 10/2002 | Houston |
| 2002/0156716 A1 | 10/2002 | Adatia |
| 2002/0161690 A1 | 10/2002 | McCarthy et al. |
| 2002/0169703 A1 | 11/2002 | Lutnick et al. |
| 2002/0169704 A1 | 11/2002 | Gilbert |
| 2002/0178104 A1 * | 11/2002 | Hausman ....................... 705/37 |
| 2002/0198815 A1 | 12/2002 | Greifeld et al. |
| 2003/0004862 A1 * | 1/2003 | Lutnick et al. .................. 705/37 |
| 2003/0009411 A1 | 1/2003 | Ram et al. |
| 2003/0033239 A1 | 2/2003 | Gilbert |
| 2003/0050888 A1 | 3/2003 | Satow et al. |
| 2003/0065613 A1 | 4/2003 | Smith |
| 2003/0083976 A1 | 5/2003 | McLister |
| 2003/0097323 A1 | 5/2003 | Khalfan et al. |
| 2003/0149636 A1 | 8/2003 | Lutnick et al. |
| 2003/0229571 A1 | 12/2003 | May |
| 2003/0229900 A1 | 12/2003 | Reisman |
| 2003/0236737 A1 | 12/2003 | Kemp et al. |
| 2004/0030634 A1 | 2/2004 | Satow |
| 2004/0034591 A1 | 2/2004 | Waelbroeck et al. |
| 2004/0044610 A1 | 3/2004 | Fraser et al. |
| 2004/0059666 A1 | 3/2004 | Waelbroeck et al. |
| 2004/0117292 A1 * | 6/2004 | Brumfield et al. .............. 705/37 |
| 2004/0117331 A1 | 6/2004 | Lutnick et al. |

| | | | |
|---|---|---|---|
| 2004/0140998 A1 | 7/2004 | Gravina et al. | |
| 2004/0158519 A1 | 8/2004 | Lutnick et al. | |
| 2004/0193519 A1 | 9/2004 | Sweeting et al. | |
| 2004/0210504 A1 | 10/2004 | Rutman | |
| 2004/0210511 A1 | 10/2004 | Waelbroeck et al. | |
| 2004/0210512 A1 | 10/2004 | Fraser et al. | |
| 2004/0218963 A1 | 11/2004 | Van Diepen et al. | |
| 2005/0004852 A1 | 1/2005 | Whitney | |
| 2005/0038731 A1 | 2/2005 | Sweeting et al. | |
| 2005/0038732 A1 | 2/2005 | Sweeting et al. | |
| 2005/0055304 A1 | 3/2005 | Lutnick et al. | |
| 2005/0075966 A1 | 4/2005 | Duka | |
| 2005/0108079 A1 | 5/2005 | Langridge | |
| 2005/0108653 A1 | 5/2005 | Langridge | |
| 2005/0119966 A1 | 6/2005 | Sandholm et al. | |
| 2005/0160032 A1 | 7/2005 | Lutnick et al. | |
| 2005/0171895 A1 | 8/2005 | Howorka et al. | |
| 2005/0216393 A1 | 9/2005 | Lutnick et al. | |
| 2005/0222941 A1 | 10/2005 | Tull, Jr. | |
| 2006/0007160 A1 | 1/2006 | Lutnick et al. | |
| 2006/0059079 A1* | 3/2006 | Howorka | 705/37 |
| 2006/0069635 A1 | 3/2006 | Ram et al. | |
| 2006/0080214 A1* | 4/2006 | Hausman et al. | 705/37 |
| 2006/0086726 A1 | 4/2006 | Yamamoto et al. | |
| 2006/0218072 A1 | 9/2006 | Noviello | |
| 2006/0229967 A1* | 10/2006 | Sweeting | 705/37 |
| 2006/0265304 A1 | 11/2006 | Brumfield et al. | |
| 2006/0265305 A1 | 11/2006 | Schluetter et al. | |
| 2006/0271475 A1 | 11/2006 | Brumfield et al. | |
| 2006/0277136 A1 | 12/2006 | O'Connor et al. | |
| 2007/0100735 A1 | 5/2007 | Kemp et al. | |
| 2007/0150708 A1 | 6/2007 | Billeci | |
| 2007/0168275 A1 | 7/2007 | Busby et al. | |
| 2007/0174162 A1 | 7/2007 | Lutnick et al. | |
| 2007/0226120 A1 | 9/2007 | Nanjundamoorthy | |
| 2007/0244795 A1 | 10/2007 | Lutnick et al. | |
| 2007/0244796 A1 | 10/2007 | Lutnick et al. | |
| 2007/0250438 A1 | 10/2007 | Fraser et al. | |
| 2007/0255642 A1 | 11/2007 | Keith | |
| 2008/0001786 A1 | 1/2008 | Lutnick et al. | |
| 2008/0071670 A1 | 3/2008 | Fraser et al. | |
| 2008/0071671 A1 | 3/2008 | Fraser et al. | |
| 2008/0077523 A1 | 3/2008 | Fraser et al. | |
| 2008/0140558 A1* | 6/2008 | Reuter et al. | 705/37 |
| 2009/0073004 A1 | 3/2009 | Lutnick et al. | |
| 2011/0066536 A1 | 3/2011 | Milne | |

FOREIGN PATENT DOCUMENTS

| | | |
|---|---|---|
| DE | 19606467 | 8/1997 |
| EP | 0412308 | 2/1991 |
| EP | 0416482 | 3/1991 |
| EP | 0512702 | 11/1992 |
| EP | 0733963 B1 | 9/1996 |
| EP | 0828223 A2 | 3/1998 |
| EP | 0993995 B1 | 4/2000 |
| EP | 1006472 | 6/2000 |
| GB | 2256954 A | 12/1992 |
| GB | 2258061 | 1/1993 |
| GB | 2313276 | 11/1997 |
| JP | 358161068 | 9/1983 |
| JP | 59184929 | 10/1984 |
| JP | 62-256164 | 11/1987 |
| JP | 11-282600 | 3/1998 |
| JP | 2003-525480 | 4/2000 |
| JP | 2002-032565 | 7/2000 |
| JP | 2001-501333 | 1/2001 |
| KR | 1992-700435 | 2/1992 |
| WO | 85/04271 | 9/1985 |
| WO | 87/03115 | 5/1987 |
| WO | WO 93/15467 | 8/1993 |
| WO | WO 95/26005 | 9/1995 |
| WO | WO 96/05563 A1 | 2/1996 |
| WO | WO 96/34356 | 10/1996 |
| WO | WO 97/37315 | 10/1997 |
| WO | WO 98/26363 | 6/1998 |
| WO | WO 98/34187 | 8/1998 |
| WO | WO 98/49639 | 11/1998 |
| WO | WO 98/52133 | 11/1998 |
| WO | WO 99/19821 | 4/1999 |
| WO | WO 00/11588 | 3/2000 |
| WO | WO 00/67172 | 4/2000 |
| WO | WO 00/26745 | 5/2000 |
| WO | WO 01/50317 | 12/2000 |
| WO | WO 01/69366 | 9/2001 |
| WO | WO 03/026135 | 3/2003 |
| WO | WO 2006108158 | 4/2006 |

OTHER PUBLICATIONS

Netessine, S.: Dynamic pricing of inventory/capacity with infrequent price changes, The Wharton School, University of Pennsylvania, Sep. 2003, pp. 1-32.*

Decision for U.K. Application No. 0517644.1 dated Nov. 19, 2010; 17 pages.

Office Action for U.K. Application No. 0517644.1 dated Nov. 2, 2009; 5 pages.

MAOI Technologies Announces IIVEeXCHANGE 2.1,PR Newswire, New York, Sep. 14, 1998, p. 1. Retrieved from ProQuest.

Enabling the "Disabled": Technologies for People with Handicaps. Wagner, Cynthia G. The Futurist. Washington: May/Jun. 1992. vol. 26, Iss. 3; p. 29, 4.

Datadesk Ships Switchboard; First User-Configurable Keyboard for Both IBM PCs and Macintosh Computers, Allows Users to Customize Keyboard, Add Input Devices. Brehm, Michaela, Jaker, Claudia. Business Wire. New York: Jun. 26, 1990. Sec. 1. p. 1.

Datadesk's User-Configurable Keyboard Allows Users to Customize Layout, Add Input Devices. Jaker, Claudia, Brehm, Michaela. Business Wire. New York: Apr. 3, 1990. Sec. 1. p. 1.

Google Definitions of protocol downloaded Dec. 4, 2009.

Merriam-Webster definition of "state" (noun), downloaded Dec. 4, 2009.

Futures, "Guide to Computerized Trading 2003", vol. XXXII, No. 8, 2003; pp. 1-5.

Definition of "protocol", Merriam-Webster Online Dictionary, downloaded Aug. 11, 2010.

"Specialist vs. Saitori: Market-Making in New York and Tokyo"; Lindsey, Richard R., Schaede, Ulrike. Financial Analysts Journal. Charlottesville: Jul./Aug. 1992. vol. 48, Iss. 4; p. 48, 10 pgs.

"Lowering exposure to counterparty failure;" Julio Bucatinsky. Wall Street & Technology. New York: Jul. 1998. Volume 16, Issue 7; p. 110, 3 pages.

"Price Quantity Strategic Market games"; Author(s): Pradeep Dubey; Econometrica, vol. 50, No. 1 (Jan. 1982), pp. 111-126.

USPTO Office Action for U.S. Appl. No. 09/851,848 , Jun. 19, 2006; 8 pages.

USPTO Office Action for U.S. Appl. No. 09/851,848, Sep. 25, 2006; 6 pages.

USPTO Office Action for U.S. Appl. No. 09/851,848, Aug. 22, 2007; 7 pages.

USPTO Office Action for U.S. Appl. No. 09/851,848, Feb. 8, 2007; 8 pages.

USPTO Notice of Allowance and Fees Due for U.S. Appl. No. 09/553,423, Feb. 21, 2008 (7 pages).

Money Match, Functional Specification, Version 1, The Sequor Group Inc. Software Services Aug. 1990 (87 pages).

Menzl, Vojtech, Czech Republic—Environmental Protection Equipment, National Trade Data Bank Market Reports, Jul. 13, 1995 (pp. 1-60).

Munnell, Alicia H., et. al., *Mortgage Lending in Boston: Interpreting HMDA Data*, The American Economic Review, vol. 86, No. 1, Mar. 1996 (30 pages).

ebay, eBay, Inc., at http://ebay.com, printed Mar. 29, 2005 (2 pages).

Sanchez, Rene, "One-Sex-Only Clubs Come Under Attack Nationwide; D.C. Antibias Law Similar to Many Others," The Washington Post, Oct. 13, 1987 (4 pages).

USPTO Office Action for U.S. Appl. No. 11/947,285, Apr. 24, 2008 (16 pages).

USPTO Office Action for U.S. Appl. No. 10/829,119, Dec. 13, 2007 (8 pages).

USPTO Office Action for U.S. Appl. No. 10/829,119, Jan. 30, 2007 (11 pages).

USPTO Office Action for U.S. Appl. No. 10/829,119, Sep. 14, 2007 (12 pages).

USPTO Office Action for U.S. Appl. No. 10/829,119, Jun. 18, 2008 (10 pages).
USPTO Office Action for U.S. Appl. No. 09/553,423, Oct. 17, 2003; 5 pages.
USPTO Office Action for U.S. Appl. No. 09/553,423, Oct. 21, 2003; 6 pages.
USPTO Office Action for U.S. Appl. No. 09/553,423, Jun. 18, 2004; 5 pages.
USPTO Office Action for U.S. Appl. No. 09/553,423, Feb. 1, 2005; 7 pages.
USPTO Office Action for U.S. Appl. No. 09/553,423, Nov. 3, 2005; 6 pages.
USPTO Office Action for U.S. Appl. No. 09/553,423, Oct. 13, 2006; 13 pages.
USPTO Office Action for U.S. Appl. No. 09/553,423, Jun. 22, 2007; 14 pages.
USPTO Office Action for U.S. Appl. No. 09/553,423, May 4, 2006; 9 pages.
USPTO Office Action for U.S. Appl. No. 09/553,423, Apr. 22, 2003; 5 pages.
USPTO Office Action for U.S. Appl. No. 08/766,733, May 21, 1998.
USPTO Notice of Allowance for U.S. Appl. No. 08/766,733, Sep. 1, 1998.
USPTO Office Action for U.S. Appl. No. 11/080,322, Jul. 25, 2008 (16 pages).
USPTO Office Action for U.S. Appl. No. 11/080,322, Apr. 16, 2009; 10 pages.
USPTO Office Action for U.S. Appl. No. 09/859,661, Mar. 4, 2009; 3 pages.
USPTO Office Action for U.S. Appl. No. 10/382,527, May 12, 2009; 8 pages.
JP Office Action for JP Application No. 2000-590084; Oct. 22, 2009; 31 pages.
USPTO Office Action for U.S. Appl. No. 09/859,661; Dec. 14, 2009; 10 pages.
Notice of Allowance for U.S. Appl. No. 11/080,322; 7 pages; Feb. 26, 2010.
U.S. Appl. No. 11/947,347, filed Apr. 28, 2010; 10 pages.
U.S. PTO Office Action for U.S. Appl. No. 11/760,508; 16 pages; Apr. 13, 2010.
U.S. PTO Office Action for U.S. Appl. No. 11/947,231; 7 pages; Apr. 15, 2010.
USPTO Office Action for U.S. Appl. No. 09/859,661, Aug. 13, 2010; 11 pages.
U.S. PTO Office Action for U.S. Appl. No. 12/335,951 dated Aug. 30, 2010; 4 pages.
U.S. Appl. No. 09/851,848, filed May 9, 2001; 17 pages.
Notice of Allowance for U.S. Appl. No. 09/851,848 dated Apr. 25, 2008; 7 pages.
PCT Search Report for PCT Application No. PCT/US02/14825 dated Feb. 25, 2003; 4 pages.
Notice of Allowance for U.S. Appl. No. 12/031,843 dated Sep. 17, 2010; 10 pages.
U.S. Appl. No. 12/031,846, filed Feb. 15, 2008; 13 pages.
PCT International Preliminary Examination Report for Application No. PCT/US02/14825 dated Dec. 13, 2005; 4 pages.
UK Examiner Report for Application No. 0326273.0 dated Jul. 23, 2004; 3 pages.
UK Examiner Report for Application No. 0326273.0 dated Jul. 11, 2005; 7 pages.
U.S. Appl. No. 12/335,951, filed Dec. 16, 2008; 16 pages.
Notice of Allowance for U.S. Appl. No. 11/947,231 dated Dec. 1, 2010; 8 pages.
Notice of Allowance for U.S. Appl. No. 11/947,347 dated Nov. 29, 2010; 12 pages.
U.S. PTO Office Action for U.S. Appl. No. 11/760,508; 19 pages; Dec. 21, 2010.
AU Examination Report for Application No. 2010200080 dated Nov. 23, 2010; 2 pages.
JP Office Action for JP Application No. 2000-590084; Mar. 17, 2011; 5 pages. (includes English Translation).
USPTO Office Action for U.S. Appl. No. 12/335,951, May 6, 2011; 5 pages.
Notice of Allowance for U.S. Appl. No. 11/947,231 dated Apr. 21, 2011; 6 pages.
Notice of Allowance for U.S. Appl. No. 11/947,347 dated Mar. 10, 2011; 13 pages.
Canadian Office Action for Application No. 2251259 dated May 3, 2010; 9 pages.
Canadian Office Action for Application No. 2354081 dated Jul. 2, 2009; 4 pages.
Brazilian Office Action for Application No. PI9916808-1 dated Feb. 1, 2011; 4 pages.
Canadian Office Action for Application No. 2493971 dated Apr. 7, 2009; 6 pages.
Canadian Office Action for Application No. 2371673 dated Feb. 12, 2010; 3 pages.
Chinese Office Action for Application No. 200510134147.0 dated May 9, 2011; 11 pages.
Notice of Allowance for U.S. Appl. No. 11/947,347; Jun. 27, 2011; 19 pages.
AU Examination Report for Application No. 2009238246 dated Jun. 1, 2011; 2 pages.
Notice of Allowance for U.S. Appl. No. 11/947,231 dated Aug. 5, 2011; 15 pages.
Brazilian Second Office Action for Application No. PI9916808-1 dated Aug. 18, 2011; 5 pages. (includes English Translation).
Decision on Appeal for PTO Office Action for U.S. Appl. No. 10/829,119; Oct. 11, 2011; 10 pages.
Record of Oral Hearing for U.S. Appl. No. 10/829,119; Nov. 3, 2011; 7 pages.
Notice of Allowance for U.S. Appl. No. 11/947,347 dated Nov. 1, 2011; 12 pages.
Notice of Allowance for U.S. Appl. No. 11/947,231 dated Nov. 23, 2011; 7 pages.
Notice of Allowance for U.S. Appl. No. 11/947,231 dated Nov. 28, 2011; 35 pages.
Notice of Allowance for U.S. Appl. No. 12/335,951 dated Dec. 1, 2011; 9 pages.
Notice of Allowance for U.S. Appl. No. 12/031,843 dated 11/15/20110; 32 pages.
Notice of Panel Decision for U.S. Appl. No. 11/760,508; 2 pages; Jul. 20, 2011.
Korean Patent Office Action for Application No. 10-2001-7007716 dated Jun. 29, 2006; 24 pages.
Chinese Office Action for Application No. 200510134147.0 dated Dec. 6, 2011; 10 pages.
U.S. PTO Notice of Allowance for U.S. Appl. No. 10/829,119; Mar. 19, 2012; 10 pages.
Notice of Allowance for U.S. Appl. No. 11/947,231 dated Mar. 8, 2012; 10 pages.
Canadian Office Action for Application No. 2493971 dated Feb. 21, 2012; 7 pages.
JP Office Action for JP Application No. 2000-590084; Mar. 2, 2012; 5 pages (includes English Translation).

* cited by examiner

FIG. 1

| | | 100 | 120 | 112 | |
|---|---|---|---|---|---|
| ASK_5 | | | 109-270 | 85 | |
| ASK_4 | | | 109-265 | 433 | |
| ASK_3 | | | 109-260 | 912 | |
| ASK_2 | | | 109-255 | 751 | |
| ASK_1 | | | 109-250 | 1012 | |
| BID_1 | | 855 | 109-245 | | |
| BID_2 | | 712 | 109-240 | | |
| BID_3 | | 630 | 109-235 | | |
| BID_4 | | 251 | 109-230 | | |
| BID_5 | | 275 | 109-225 | | |

| | 200 | | 222 | 112 |
|---|---|---|---|---|
| ASK_5 | | | 109-270 | 85 |
| ASK_4 | | | 109-265 | 433 |
| ASK_3 | | | 109-260 | 912 |
| ASK_2 | | | 109-255 | 751 |
| ASK_1 | | | 109-250 | 1012 |
| BID_1 | 855 | 109-245 | | |
| BID_2 | 712 | 109-240 | | |
| BID_3 | 630 | 109-235 | | |
| BID_4 | 251 | 109-230 | | |
| BID_5 | 275 | 109-225 | | |

| | 300 | | 322 | 112 | |
|---|---|---|---|---|---|
| BID_1 | 855 | 109-245 | 109-250 | 1012 | ASK_1 |
| BID_2 | 712 | 109-240 | 109-255 | 751 | ASK_2 |
| BID_3 | 630 | 109-235 | 109-260 | 912 | ASK_3 |
| BID_4 | 251 | 109-230 | 109-265 | 433 | ASK_4 |
| BID_5 | 275 | 109-225 | 109-270 | 85 | ASK_5 |

111    321

SYSTEMS AND METHODS FOR PROTECTING AGAINST ERRONEOUS PRICE ENTRIES IN THE ELECTRONIC TRADING OF FINANCIAL AND OTHER INSTRUMENTS

CROSS-REFERENCES TO RELATED APPLICATION

This application claims the benefit of U.S. Provisional Application No. 60/665,306, filed Mar. 24, 2005, which is hereby incorporated by reference herein in its entirety.

FIELD OF THE INVENTION

This invention relates to electronic trading systems. More particularly, this invention relates to systems and methods for protecting against the occurrence of erroneous price entries in electronic trading systems.

BACKGROUND OF THE INVENTION

Much trading today involves some computer support, from simple information delivery to sophisticated trading systems that automate transactions of goods and services. Electronic trading systems and methods have gained widespread acceptance for trading of a wide variety of items ranging from financial instruments (such as stocks, bonds, currency, futures, options, etc.) to household goods (such as old records, antiques, wines, etc.).

As electronic trading becomes more popular, an increasing number of traders are in need of new systems and methods to enter trade commands in a quick, efficient and accurate manner. This is especially true given that market conditions change quickly as trades are executed at a fast pace. Price positions may therefore change rapidly and sometimes almost simultaneously. Users of such systems therefore face the risk of entering trade commands at erroneous price levels by, for example, using a mouse pointer to select a price that may have changed by the time the command is registered by the system. Such erroneous entries can lead to highly undesirable results in a rapidly changing market. Many such users are traders that track more than one active market by typically looking at multiple windows, interfaces or screens simultaneously, thereby increasing the likelihood that such erroneous entries occur.

It would be therefore desirable to provide systems and methods for protecting against the occurrence of erroneous price entries in electronic trading while ensuring that trade commands are entered in an efficient and accurate manner.

SUMMARY OF THE INVENTION

Therefore, it is an object of the invention to provide systems and methods for protecting against the occurrence of erroneous price entries in electronic trading while ensuring that trade commands are entered in an efficient and accurate manner.

This and other objects are accomplished in accordance with the principles of the invention by providing systems and methods for displaying market information for, and allowing for electronic trading in, items through a user interface. More specifically, some embodiments of the invention provide an interface for use with an electronic trading system that notifies a user that the price at which he or she may have attempted to trade has changed and by presenting the user with the opportunity to submit, modify or cancel the trade command. The user may configure the trading system to enable such a notification based on the time span for the price change, the number of increments of the price change, a combination thereof or any other appropriate consideration.

For example, the system may display on a user interface a plurality of bid and ask prices and receive a trade command from the user to hit or lift at least one price from the plurality of bid and ask prices. A determination is made as to whether the at least one price has changed by at least a predetermined number of increments from a first price to a second price and/or whether the change in price has occurred within a predetermined period of time. Based on the determination(s), the user may be presented with the opportunity to submit at least a portion of the size associated with the trade command at the second price or cancel the trade command. The predetermined number of increments and/or the predetermined period of time may be selected by the user. Subsequent trade commands by the users or third parties, such as the cancellation of existing bids and offers or the entry of new bids/offers or hit/lifts, may be used to validate prices and execute trades at these prices.

The present invention may be used in any kind of trading application, system or exchange such as auction trading systems, interactive matching systems, automated matching systems, price improvement systems, FIFO (First In, First Out) systems, RFQ (Request for Quote) systems, etc., and may be applied to the trading of any types of items. The present invention may be implemented by a trading application that is run on the user's workstation or may be implemented by the trading system on a central server linked to such workstation for processing trading commands and executing trades.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which:

FIG. 1 is an illustration of an exemplary interface that may be displayed to users in accordance with certain embodiments of the present invention;

FIG. 2 is an illustration of an alternative embodiment of an exemplary interface that may be displayed to users in accordance with certain embodiments of the present invention;

FIG. 3 is an illustration of another alternative embodiment of an exemplary interface that may be displayed to users in accordance with certain embodiments of the present invention;

DETAILED DESCRIPTION OF THE INVENTION

Figure 4:
FIG. 4 is an illustration of yet another alternative embodiment of an exemplary interface that may be displayed to users in accordance with certain embodiments of the present invention.

The invention is directed to systems and methods that provide an interface that notifies a user that the price at which he or she may have attempted to trade has changed and by presenting the user with the opportunity to submit, modify or cancel the trade command, thereby protecting against the occurrence of erroneous price entries. Trade commands may include bid, ask, buy or sell commands that are submitted by users to a trading system. A bid may include a bid price—i.e., a dollar amount proposed to buy an issue or item—and a bid size—i.e., the volume of the particular bid. Similarly, an ask or offer may include an ask or offer price—i.e., a dollar amount proposed to sell an issue or item—and an ask or offer size—i.e., the volume of the particular ask or offer. Bids and asks are displayed by the trading system to other users who may respond to the bids and asks by submitting sell (or hit) or buy (or lift) commands to the system.

Further details of the invention are described below in relation to FIGS. 1-6.

FIG. 1 illustrates interface 100, which includes column 120 for displaying bid and ask prices, column 111 for displaying bid sizes and column 112 for displaying ask sizes. Each size that is displayed in columns 111 and 112 may be associated with a corresponding and adjacent bid or ask price in column 120. For example, a size of 855 may be associated with the highest bid price of 109-245 for which size exists—i.e., the best bid. Similarly, a size of 1012 may be associated with the lowest ask price of 109-250 for which size exists—i.e., the best ask. The best bid and ask may be referred to as the inside market.

FIG. 2 illustrates interface 200 which may differ from interface 100 at least in that the bid prices and ask prices are separated or displayed along different columns 221 and 222, respectively. The inside market is not displayed along an axis that is perpendicular to the price columns or axes. Alternatively, the best bid may be displayed alongside or adjacent to—e.g., along the same row as—the best ask. Therefore, the inside market may be displayed along a horizontal axis that is perpendicular to the vertical axes along which prices and sizes are displayed. In each of FIGS. 1 and 2, the inside market may be centered within the interface.

FIG. 3 illustrates interface 300 which may differ from interface 100 at least in that the bid prices and sizes may be displayed alongside or adjacent to—e.g. along the same rows as—the ask prices and sizes. Similar to interface 200 of FIG. 2, the bid prices and ask prices in interface 300 may be separated or displayed along different columns 321 and 322, respectively.

For FIGS. 1-3, it should be noted that, in accordance with some embodiments of this invention, price columns 120, 221, 222, 321 and 322 are dynamic. That is, the prices in these columns may change as different bids and offers are entered and trades are executed. In other words, the physical locations of the displayed prices may remain the same whereas the values displayed in the same locations may change. For example, the prices in FIGS. 2 and 3 may move up and down within each column as well as from column to column, both vertically and horizontally, based on changes in the inside market. Moreover, when the inside market changes, its location may change from a first location centered within the interface to a second location along the price columns. The inside market may then transition back to the center of the interface.

Portions of the following description of some embodiments of the present invention is discussed in connection with FIG. 1. However, the present invention may be practiced in connection with the interfaces in FIGS. 1-3 and any other interface, trading application or electronic trading system.

A user may enter trade commands to bid, offer, buy or sell at any price using a pointing device, keyboard, a combination of the same or any other appropriate input device(s). For example, the user may choose to buy at the current best ask price of 109-250 by moving a pointer to that price in column 120 and clicking an appropriate button of a pointing device. Alternatively, the user may press a BUY button on a keyboard or a trading window, which may be associated with the best bid price that is displayed. The user may choose to join the current best ask by pointing to that price and clicking on an appropriate button or pressing on an ASK button. Similarly, the user may choose to sell at the current best bid price of 109-245 by moving a pointer to that price in column 120 and clicking an appropriate button of a pointing device. Alternatively, the user may press a SELL button on a keyboard or a trading window, which may be associated with the best bid price that is displayed. The user may choose to join the current best bid by pointing to that price and clicking on an appropriate button or pressing on a BID button.

The present invention may protect the user from entering undesired or erroneous trade commands as the result of changes in such prices by adding at least one additional step to the order entry process when particular conditions are met. More specifically, the user may be notified that the price has changed and may be presented with the opportunity to submit, modify or cancel the trade command subject to time frame and/or price increment conditions. The notification may be in the form of a popup window, a sound, a combination thereof or any other appropriate method for grabbing the user's attention. The opportunity to submit, modify or cancel the trade command may also be presented through the same popup window or any other appropriate method.

For example, a user may see a price of 109.250 which he or she would like to trade at displayed in a particular location in the interface. By the time the user acts with the keyboard or mouse to enter a trade command on that price, the actual price displayed in the same location will have changed from 109-250 to 109-255. As a result, popup window 400 of FIG. 4 may be displayed to the user. In this particular example, popup window 400 may be displayed in order to confirm that the user would still desire to trade at the new price of 109-255, as displayed in window 400 or whether the user wishes to cancel his or her trade command. As shown in FIG. 4, window 400 may include an indication that the market is moving or changing at a fast pace. Alternatively, the popup window may display both the new price and size and may give the user the opportunity to modify the order by increasing or decreasing the price and/or the size displayed in the window. The user may, for example, choose to submit at least a portion of the trade at the new price level. For example, the user may choose to reduce the size of the trade. These and other examples may apply to any type of trade command entry such as limit orders, market orders and stop orders, etc.

For example, for a user entering a market order for a current market price—e.g., the best bid or best ask price—the updated current market price may be displayed to the user, and the user may be presented with an opportunity to confirm the order by submitting the trade command, to modify the order by changing the price or size of the order or to cancel the order. Similarly, when a user selects a price at which to enter an order, the updated current market price may be displayed to the user, and the user may be presented with an opportunity to confirm the order by submitting the trade command, to modify the order by changing the price or size of the order or to cancel the order, in case the price selected by the user has changed since the order was entered.

In some embodiments of the present invention, the notification may be displayed whenever the price changes, regardless of whether the change is a decrease or an increase in the price. Similarly, the user may be presented with the opportunity to submit, modify or cancel the trade command whenever the price changes, regardless of whether the change is a decrease or an increase in the price. In other embodiments, the user may be presented with the opportunity to submit, modify or cancel the trade command only when the change in price is unfavorable to the user. For example, the user may be notified of an increase in an ask price and may be presented with an opportunity to submit, modify of cancel the trade at the new ask price if the ask price has increased after the user submitted a buy (or lift) command at the previous ask price. If the ask price has decreased, the user may still be notified of the decrease in the bid price, however, he or she may not be presented with the opportunity to modify or cancel the trade command and the trade may be executed at the new price. Alternatively, the user may not be notified of the decrease in the ask price or presented with the opportunity to modify or cancel the trade command. Similarly, if the user desires to sell at a bid price that has decreased, then the user may be presented with an opportunity to submit, modify or cancel the hit trade command. If the bid price has increased, the user may still be notified of the increase in the bid price and may or may not be presented with the opportunity to modify or cancel the trade command. Alternatively, the user may not be notified of the increase in the bid price or presented with the opportunity to modify or cancel the trade command. Such notification may be implemented in response to trade commands by the user at any price or may only be implemented for select prices, such as inside market prices—i.e., when the trade command is entered on the best bid or ask price.

Figure 5:
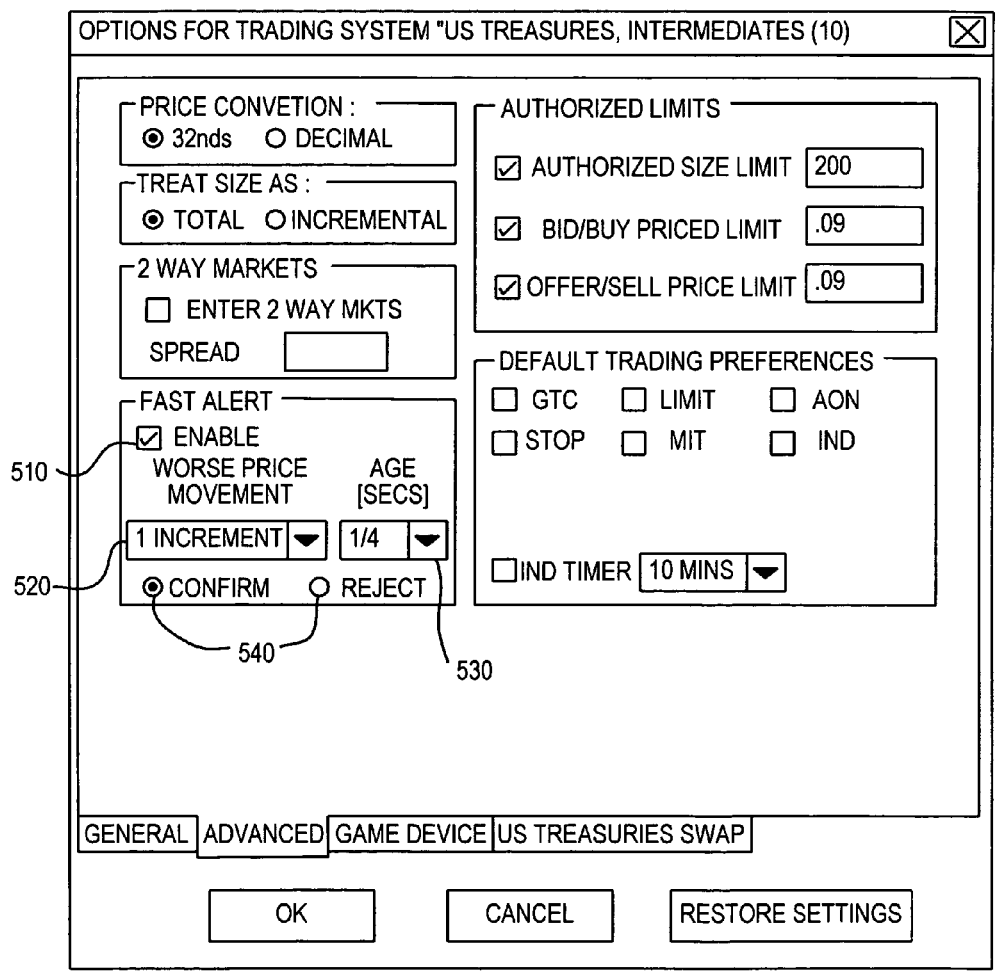
FIG. 5 is an illustration of yet another alternative embodiment of an exemplary interface that may be displayed to users in accordance with certain embodiments of the present invention.

Moreover, whether the user is notified of a price change and/or whether the user is presented with the opportunity to submit, modify or cancel the trade command may depend on other factors that may be set by the user. More specifically, the user may select options that specify conditions for which such notification may be enabled. FIG. 5 illustrates an interface in the form of window 500 which may allow the user to select such options. To implement such a feature, the system or trading application may track changes in each price level and the times at which such changes occur.

Window 500 of FIG. 5 may include fields 510, 520, 530 and 540. Field 510 allows the user to enable or disable the notification and/or the presentation of the opportunity to submit, modify or cancel the trade. Field 520 allows the user to select the number of price increments by which the price has to at least change in order to trigger the notification coupled with the opportunity to submit, modify or cancel the trade command. For example, field 520 may include a drop down menu that allows the user to specify whether the price has to change by at least one increment, two increments, three increments, etc. A single increment may correspond to the minimum allowable increment level for the particular item being traded. For example, referring back to FIG. 1, one increment may correspond to 000-005. Accordingly, if the user selects "4 increments" from the drop down menu and chooses to buy at 109-250, then the system may execute a trade for new price 109-255, 109-260 or 109-265 without presenting the user with the opportunity to submit, modify or cancel the trade command. If the new price is 109-270 or more, then the user may be presented with the opportunity to submit, modify or cancel the trade command. Alternatively, the user may enter a minimum value for the price increment by which the price has to change. The user may specify that any decrease in price, no matter how small, should trigger such notification and opportunity. The user may instead specify that any increase in price, no matter how small, should trigger such notification and opportunity. Alternatively, the user may specify that any change (increase or decrease) in price, no matter how small, should trigger such notification and opportunity.

Field 530 allows the user to select the amount of time that has passed since the change in price in order to trigger the notification coupled with the opportunity to submit, modify or cancel the trade command. For example, field 530 may include a drop down menu that allows the user to specify whether the price has to have changed within a ¼ of a second, ½ of a second, 1 second, 2 seconds, or any other amount of time. For example, referring back to FIG. 1, if the user selects "1" from the drop down menu and chooses to buy at 109-250, then the system may execute a trade at the new price without presenting the user with the opportunity to submit, modify or cancel the trade command, as long as the price change has not occurred within the past second. Alternatively, the user may enter a value for a minimum amount of time that has to elapse since the price change. The user may instead choose that such notification and opportunity should be triggered for any amount of time that has passed since the price change.

The user may choose to apply one of the two conditions selected through fields 520 and 530 or both. For example, according to the values displayed in fields 520 and 530 of FIG. 5, the user may be notified of a price change and presented with an opportunity to submit, modify or cancel a trade command if the chosen price has changed by the minimum increment allowed within the last quarter of a second.

Fields 540 allow the user to select the particular mode of notification and opportunities that may be presented to the user. For example, by choosing the "confirm" option, the visual notification given to the user may allow the user to confirm or cancel the trade command when the conditions specified in fields 520 and 530 are met. Such a visual notification may be an interface in the form of a popup window 400 shown in FIG. 4. Choosing the "reject" option may lead to the automatic cancellation, and corresponding notification, of every trade command when the conditions specified in fields 520 and 530 are met.

Figure 6:
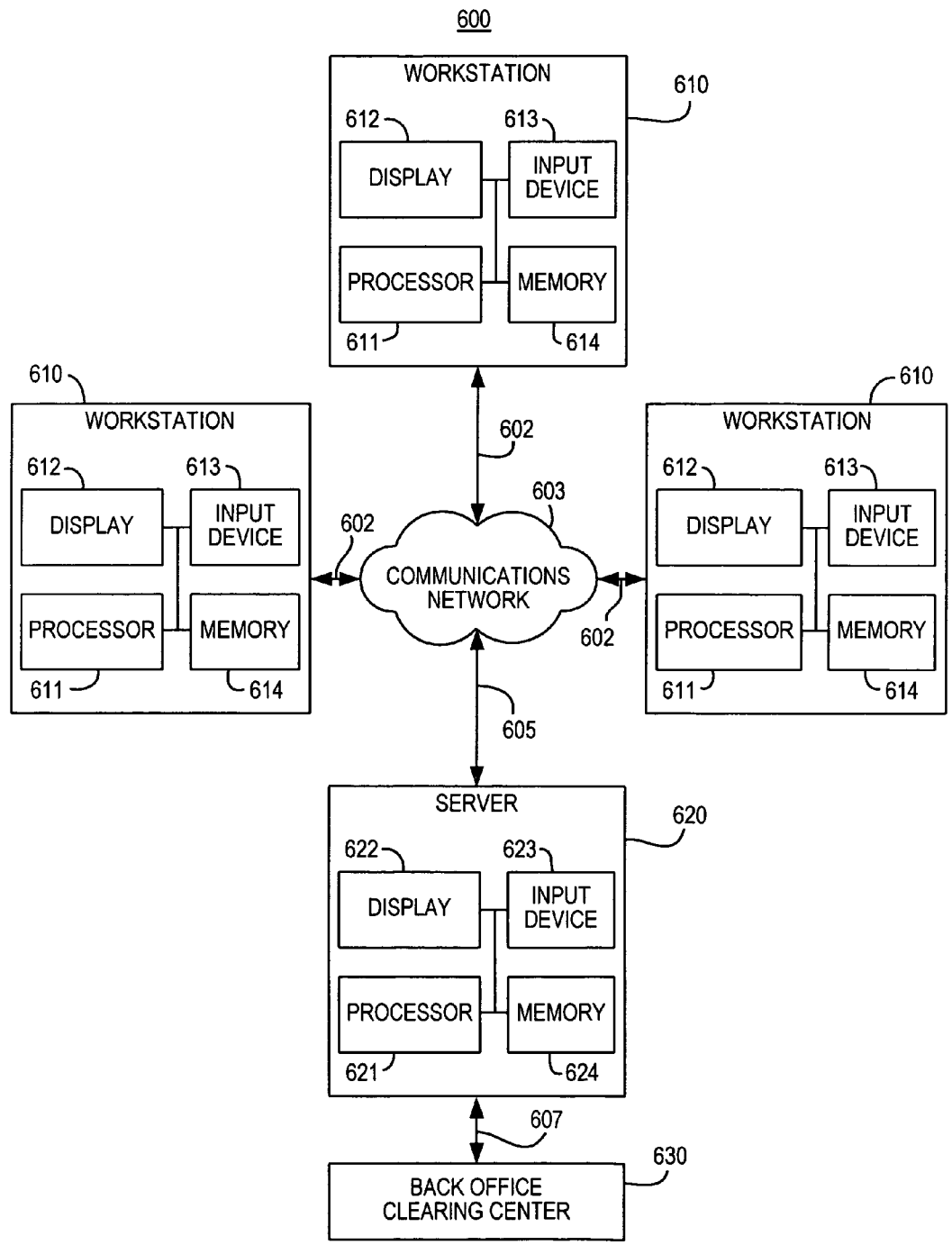
FIG. 6 is a block diagram of an exemplary system that may be used to implement the processes and functions of certain embodiments of the present invention.

Referring to FIG. 6, exemplary system 600 for implementing the invention is shown. As illustrated, system 600 may include one or more workstations 610. Workstations 610 may be local or remote, and are connected by one or more communications links 602 to communications network 603 that is linked via communications link 605 to server 620. Server 620 may be linked to back office clearing center 630 via communications link 607.

Server 620 may be any suitable server, processor, computer, data processing device, or combination of the same. Server 620 may be used to implement the governing logic that processes and executes orders and trades, and distributes trade and market information, including price and size information, to workstations 610. Communications network 603 preferably includes the Internet but may consist of any suitable computer network such as an intranet, a wide-area network (WAN), a local-area network (LAN), a wireless network, a digital subscriber line (DSL) network, a frame relay network, an asynchronous transfer mode (ATM) network, a virtual private network (VPN), or any combination of the same. Communications links 602 and 605 may be any communications links suitable for communicating data between workstations 610 and server 620, such as network links, dial-up links, wireless links, hard-wired links, etc.

Workstations 610 may be personal computers, laptop computers, mainframe computers, dumb terminals, data displays, Internet browsers, Personal Digital Assistants (PDAs), two-way pagers, wireless terminals, portable telephones, etc., or any combination of the same. Workstations 610 may be used by participants to enter, modify or cancel bid, ask, buy and sell orders for the items being traded and view market activity corresponding to these items.

A typical workstation 610 may include processor 611, display 612, input device 613, and memory 614, which may be interconnected. In a preferred embodiment, memory 614 includes a storage device for storing a workstation program for controlling processor 611. Memory 614 may also store user configuration files, as described below, and other data on the storage device. The workstation program may include a trading application for running the interfaces shown in FIGS. 1-5 and displayed on display 612. Input device 613 may be used in conjunction with display 612 by users to enter bids/asks on desired items, to execute and monitor trades by, for example, submitting, modifying or canceling hit/lift commands, and to set time frame and/or price increment conditions, as discussed above. Processor 611 may use the workstation program to receive trade information relating to the items being traded by multiple users of system 600, or other users, and display such information on display 612 or communicate such information to display 612. Processor 611 may also use the workstation program to monitor prices, receive trade commands from the user of workstation 610, register when such commands are entered, determine whether a change in price has occurred based on the prices, trade commands and time frame and/or price increment conditions, present the user with the opportunity to submit, modify or cancel the trade command as discussed above, and cancel such orders or submit them to server 620.

Server 620 may include processor 621, display 622, input device 623, and memory 624, which may be interconnected. In a preferred embodiment, memory 624 includes a storage device for storing a server program that provides the governing logic for controlling processor 621. Processor 621 may use the server program to process orders and execute trades communicated from various workstations that are operated by multiple users of system 600, or other users, and communicate trade information, as well as bid and ask information, to workstations 610 and back office clearing center 630. More specifically, processor 621 may use the server program to process orders placed by users in response to users entering commands using input device(s) 613, and execute trades based on such orders, whenever applicable. Processor 621 may also perform at least some of the functions of processor 611.

Back office clearing center 630 may be any suitable equipment, such as a computer, a laptop computer, a mainframe computer, etc., or any combination of the same, for causing trades to be settled and/or verifying that trades are settled. Communications link 607 may be any communications links suitable for communicating data between server 620 and back office clearing center 630, such as network links, dial-up links, wireless links, hard-wired links, etc.

The present invention may be practiced in embodiments that include any layout techniques, shapes or forms other than ones described above. For example, prices and sizes may be displayed along substantially circular axes rather than columns such that the resulting interactive interface represents a full circle or ellipse or at least a portion of a circle or ellipse. Moreover, the size, shape, arrangement, color, and label of various portions of the interfaces discussed or shown are examples shown for purposes of illustration only. It will be understood that modifications of any or all of the foregoing characteristics of these portions are within the scope of the invention. Embodiments discussed or shown herein may be applied to trading interfaces that use single static price axis, dual dynamic price axis, or any other suitable display.

The interfaces described herein may be used in any kind of trading application, system or exchange such as auction trading systems, interactive matching systems, automated matching systems, price improvement systems, FIFO (First In, First Out) systems, RFQ (Request for Quote) systems, etc., and may be applied to the trading of any types of items. This includes cases where users are or are not granted exclusive rights to trade, cases where users are or are not provided with a share of a trade based on their status or market role, the stage during which they start or join a trade and/or their degree or extent of participation, cases where users are or are not provided with shares of a trade on a pro-rata basis based on existing agreements or distribution algorithms, or any combination of the same.

Moreover, the trading application described herein may be any suitable, software, hardware, or both configured to implement the features of the invention. The trading application may be located at a central location (e.g., a central server such as server 620 of FIG. 6) and instances thereof may be stored on workstations connected thereto (e.g., workstations 601 of FIG. 6). In another suitable approach, the trading application may reside among different locations (e.g., a network such as communications network 603 of FIG. 6).

The trading systems and methods described above, or variation thereof, may be implemented in conjunction with the interfaces discussed or shown herein, or in conjunction with variations on those displays.

In certain embodiments of the present invention, the time period to submit, modify or cancel a trade command (which will be referred to hereafter as the "cooling off period") may be truncated based upon subsequent actions of the users who entered the trade command or other users. The following four tables and corresponding descriptions include examples of such embodiments.

Scenario 1

| User Action | Time | System Response |
| --- | --- | --- |
| Cancel 100.102 best bid | 0 ms | Promote 100.10 bid to best bid. Start 500 ms worse market change timer. |
| Hit best bid | 10 ms | Start 750 ms cooling off period. |
| Cancel 100.10 bid by bidder | 25 ms | Reject Cancel and immediately execute trade. |

Scenario 1 depicts an aspect of the invention that applies to the following exemplary set of circumstances: A bid to buy an item at 100.102 was listed as the best bid. The best bid is subsequently canceled thereby causing the next highest bid of 100.10 to the become the new best bid in the system. Within an exemplary time period—e.g., 500 milliseconds (ms)—following the cancellation, a user attempts to sell at the best bid by hitting the best bid in the system. Examples of order types that include attempts to sell at the best bid in the system are a sell all order, which sells to all available buy orders (a certain quantity may be specified), and a market sell order, which specifies that the user intends to sell a quantity of the item at the then available market price. In view of the fact that the 100.102 bid was cancelled within the last 500 ms, the system does not assume that the user that attempted to hit the bid would have agreed to sell at the lower present best bid of 100.10. In response to this uncertainty, the system preferably provides a user-configurable cooling off time period—e.g., 750 ms—during which the user can elect to void the trade, or at least a portion thereof. This process has been described in detail above.

Scenario 1 adds an additional feature to the method according to the present invention as follows. If, after the hit command is received against the 100.10 following the cancellation of the 100.102 bid, the 100.10 is canceled by the original bidder, the system may assume that the price of 100.10 is a valid price to trade. This assumption is based on the fact that the bidding party attempted to cancel. As such, the system truncates the cooling off period that was running and immediately executes the trade at the 100.10 price between the user who was attempting to hit the bid and the bidder who was attempting to cancel it. Accordingly, subsequent trade commands from the users may be used to validate the price.

Scenario 2

| User Action | Time | System Response |
| --- | --- | --- |
| Cancel 100.102 best bid | 0 ms | Promote 100.10 bid to best bid. Start 500 ms worse market change timer. |
| Hit best bid | 10 ms | Start 750 ms cooling off period. |
| Hit best bid by third party | 600 ms | Immediately execute trade received after 500 ms. Queue 2$^{nd}$ sell request. |

Scenario 2 differs from Scenario 1 with respect to the reason for truncating the cooling off period and executing the trade. Whereas Scenario 1 truncates the cooling off period and executes the trade immediately in response to an attempt to cancel the 100.10 bid, scenario 2 truncates the cooling off period and executes the trade in response to receiving an additional hit at the 100.10 price. In this scenario, the fact that a third party attempted to sell at the 100.10 price validates the existing price.

Preferably, the cooling off period is not truncated and the trade is not executed unless the additional attempt to sell is received following the expiration of the original 500 ms that starts running when the 100.102 bid is canceled. Otherwise, the additional hit command may also have been entered in response to the 100.102 bid and not the 100.10 bid.

Scenario 3

| User Action | Time | System Response |
| --- | --- | --- |
| Cancel 100.102 best bid | 0 ms | Promote 100.10 bid to best bid. Start 500 ms worse market change timer. |
| Hit best bid | 10 ms | Start 750 ms cooling off period. |
| Enter bid at 100.102 by another. | 300 ms | Immediately execute trade at 100.102. |

Scenario 3 also differs from scenarios 1 and 2 with respect to the reason for truncating the cooling off period and executing the trade. Scenario 3 truncates the timer and executes the trade in response to the receipt of an additional bid at the original 100.102 price. In this scenario, the trade is executed at the original best bid of 100.102, as the additional bid at that price causes the system to assume it is valid. Preferably, the additional bid of 100.102 may cause truncation of the cooling off period if the additional bid of 100.102 is received before the trade with the lower 100.10 bid is executed—i.e., anytime before the expiration of the 750 ms cooling off period.

Scenario 4

| User Action | Time | System Response |
| --- | --- | --- |
| Cancel 100.102 best bid | 0 ms | Promote 100.10 bid to best bid. Start 500 ms worse market change timer. |
| Hit best bid | 10 ms | Start 750 ms cooling off period. |
| Enter bid at 100.10+ by another. | 300 ms | Immediately execute trade at 100.102 or 100.10+. |

Whereas scenario 3 truncates the timer and executes the trade in response to the receipt of an additional bid at the original 100.102 price, scenario 4 relates to the situation where another user bids at a price that is higher than the original best bid of 100.102—e.g., 100.10+. Such a price is higher than the highest possible price anticipated by the original seller. Accordingly, the system may execute a trade at either the 100.102 price or the 100.10+price. Preferably, the trade is executed at 100.102 so that the new buyer is given a better (lower) price and the original seller sells at the best price that he or she could have anticipated.

As can be seen, some of the aforementioned scenarios are examples of using trade commands from other users to make assumptions about the intents of users and determine the validity of prices. For example, scenario 2 truncates the cooling off period and executes a trade between the first two users based on the receipt of the additional sell from a third party. Accordingly, the use of third-party behavior to validate and/or regulate the actions of two other parties is an additional feature of some embodiments of the present invention.

It will be understood that the foregoing is only illustrative of the principles of the invention, and that various modifications can be made by those skilled in the art without departing from the scope and spirit of the invention, and the invention is limited only by the claims that follow.

What is claimed is:

1. A method, comprising:
   displaying by a workstation on a user interface to a user a plurality of bid and ask prices;
   receiving by the workstation a trade command from the user to hit or lift at least one price from the plurality of bid and ask prices;
   in response to receiving the trade command, determining by the workstation that the at least one price has changed from a first price to a second price within a predetermined period of time from a receipt of the trade command and that the change from the first price to the second price is by at least a predetermined number of increments; and
   based at least in part on determining that the at least one price has changed within the predetermined period of time and that the change is by at least the predetermined number of increments, presenting by the workstation to the user an opportunity to submit at least a portion of the trade command at the second price or cancel the trade command;
   wherein the method further comprises determining by the workstation that the change from the first price to the second price is unfavorable to the user; and
   wherein presenting to the user the opportunity to submit or cancel the trade command further comprises presenting to the user the opportunity to submit or cancel the trade command based at least in part on determining that the change from the first price to the second price is unfavorable to the user.

2. The method of claim 1, wherein presenting to the user the opportunity to submit or cancel the trade command further comprises presenting to the user an opportunity to modify the trade command.

3. The method of claim 1, wherein presenting to the user the opportunity to submit or cancel the trade command comprises displaying to the user a window indicating the second price and requesting that the user confirm the trade command.

4. The method of claim 1, further comprising the workstation notifying the user that the at least one price has changed through a sound.

5. The method of claim 1, wherein the user is presented with the opportunity to submit at least a portion of the trade command at the second price for select bid and ask prices.

6. The method of claim 1, further comprising displaying by the workstation to the user a window, wherein the window includes a field that is selectable by the user, and wherein a selection of the field by the user disables the feature of presenting to the user the opportunity to submit at least a portion of the trade command at the second price or cancel the trade command.

7. The method of claim 1, wherein the predetermined number of increments is selected by the user.

8. The method of claim 1, wherein the predetermined period of time is selected by the user.

9. The method of claim 1, wherein the trade command comprises one of:
   a sell all order,
   a buy all order,
   a market sell order, and
   a market buy order.

10. A method, comprising:
    displaying by at least one server on a user interface of a workstation in use by a user a plurality of bid and ask prices;
    receiving by the at least one server a trade command from the user to hit or lift at least one price from the plurality of bid and ask prices;
    in response to receiving the trade command, determining by the at least one server that the at least one price has changed from a first price to a second price within a predetermined period of time from a receipt of the trade command and that the change from the first price to the second price is by at least a predetermined number of increments; and
    based at least in part on determining that the at least one price has changed within the predetermined period of time and that the change is by at least the predetermined number of increments, presenting by the at least one server to the user via the workstation an opportunity to submit at least a portion of the trade command at the second price or cancel the trade command;
    wherein the method further comprises determining by the at least one server that the change from the first price to the second price is unfavorable to the user; and
    wherein presenting to the user the opportunity to submit or cancel the trade command further comprises presenting to the user the opportunity to submit or cancel the trade command based at least in part on determining that the change from the first price to the second price is unfavorable to the user.

11. The method of claim 10, wherein presenting to the user the opportunity to submit or cancel the trade command further comprises presenting to the user an opportunity to modify the trade command.

12. The method of claim 10, wherein presenting to the user the opportunity to submit or cancel the trade command comprises displaying to the user via the workstation a window indicating the second price and requesting that the user confirm the trade command.

13. The method of claim 10, further comprising the at least one server causing the workstation to notify the user that the at least one price has changed through a sound.

14. The method of claim 10, wherein the user is presented with the opportunity to submit at least a portion of the trade command at the second price for select bid and ask prices.

15. The method of claim 10, further comprising displaying by the at least one server to the user via the workstation a window, wherein the window includes a field that is selectable by the user, and wherein a selection of the field by the user disables the feature of presenting to the user the opportunity to submit at least a portion of the trade command at the second price or cancel the trade command.

16. The method of claim 10, wherein the predetermined period of time is selected by the user.

17. The method of claim 10, wherein the predetermined number of increments is selected by the user.

18. The method of claim 10, further comprising:
    withdrawing by the at least one server the opportunity to submit at least a portion of the trade command at the second price or cancel the trade command; and
    executing by the at least one server the trade command at the second price.

19. The method of claim 18,
    wherein the method further comprises receiving by the at least one server a cancellation command for an order associated with the second price;
    wherein the cancellation command is received after the trade command; and
    wherein withdrawing the opportunity and executing the trade command is in response to receiving the cancellation command.

20. The method of claim 18,
    wherein the method further comprises receiving by the at least one server a second trade command to hit or lift an order associated with the second price;
    wherein the second trade command is received after the trade command; and
    wherein withdrawing the opportunity and executing the trade command is in response to receiving the second trade command.

21. The method of claim 10, wherein the method further comprises:
    receiving by the at least one server a second trade command providing a price that is the same as the first price, wherein the second trade command is received after the trade command; and
    in response to receiving the second trade command:
        withdrawing by the at least one server the opportunity to submit at least a portion of the trade command or cancel the trade command; and
        executing by the at least one server the trade command at the first price.

22. The method of claim 10, wherein the method further comprises:
    receiving by the at least one server a second trade command providing a price that is better than the first price, wherein the second trade command is received after the trade command; and
    in response to receiving the second trade command:
        withdrawing by the at least one server the opportunity to submit at least a portion of the trade command or cancel the trade command; and executing by the at least one server the trade command at a price that includes one of:
the first price, and
the better price.

23. The method of claim 10, wherein the trade command comprises one of:
a sell all order,
a buy all order,
a market sell order, and
a market buy order.

24. A system comprising a workstation having software stored thereon that when executed, directs the workstation to:
display on a user interface to a user a plurality of bid and ask prices;
receive a trade command from the user to hit or lift at least one price from the plurality of bid and ask prices;
in response to receiving the trade command, determine that the at least one price has changed from a first price to a second price within a predetermined period of time from a receipt of the trade command and that the change from the first price to the second price is by at least a predetermined number of increments; and
based at least in part on determining that the at least one price has changed within the predetermined period of time and that the change is by at least the predetermined number of increments, present to the user an opportunity to submit at least a portion of the trade command at the second price or cancel the trade command;
wherein the software, when executed, further directs the workstation to determine that the change from the first price to the second price is unfavorable to the user; and
wherein presenting to the user the opportunity to submit or cancel the trade command further comprises presenting to the user the opportunity to submit or cancel the trade command based at least in part on determining that the change from the first price to the second price is unfavorable to the user.

25. A system comprising at least one server having software stored thereon that when executed, directs the at least one server to:
display on a user interface of a workstation in use by a user a plurality of bid and ask prices;
receive a trade command from the user to hit or lift at least one price from the plurality of bid and ask prices;
in response to receiving the trade command, determine that the at least one price has changed from a first price to a second price within a predetermined period of time from a receipt of the trade command and that the change from the first price to the second price is by at least a predetermined number of increments; and
based at least in part on determining that the at least one price has changed within the predetermined period of time and that the change is by at least the predetermined number of increments, present to the user via the workstation an opportunity to submit at least a portion of the trade command at the second price or cancel the trade command;
wherein the software, when executed, further directs the at least one server to determine that the change from the first price to the second price is unfavorable to the user; and
wherein presenting to the user the opportunity to submit or cancel the trade command further comprises presenting to the user the opportunity to submit or cancel the trade command based at least in part on determining that the change from the first price to the second price is unfavorable to the user.

* * * * *